United States Patent [19]

Watson

[11] 4,316,329
[45] Feb. 23, 1982

[54] INSTRUMENTED REMOTE CENTER COMPLIANCE DEVICE

[75] Inventor: Paul C. Watson, Brentwood, N.H.

[73] Assignee: The Charles Stark Draper Laboratory, Cambridge, Mass.

[21] Appl. No.: 76,907

[22] Filed: Sep. 19, 1979

[51] Int. Cl.³ .............................................. G01B 5/25
[52] U.S. Cl. ............................. 33/169 C; 33/172 D; 33/172 E; 33/185 R
[58] Field of Search ............ 33/169 C, 172 D, 185 R, 33/180 R, 181, 174 L, 178 E

[56] References Cited

U.S. PATENT DOCUMENTS

| | | | |
|---|---|---|---|
| 3,241,243 | 3/1966 | Speer | 33/174 L |
| 3,362,076 | 1/1968 | Bailey | 33/169 C |
| 4,060,906 | 12/1977 | Heizmann | 33/172 D X |
| 4,078,314 | 3/1978 | McMurtry | 33/174 L |
| 4,098,001 | 7/1978 | Watson | 33/185 R |

*Primary Examiner*—Harry N. Haroian
*Attorney, Agent, or Firm*—Joseph S. Iandiorio

[57] ABSTRACT

A remote center compliance device having an operator member and a remote compliance center near the end of the operator member, including one or more displacement sensors proximate the operator member for sensing displacement in one or more degrees of freedom of the operator member.

11 Claims, 15 Drawing Figures

INSTRUMENTED REMOTE CENTER COMPLIANCE DEVICE

FIELD OF INVENTION

This invention relates to an instrumented remote center compliance device, and more particularly to an instrumented system including one or more displacement sensors located about the operator member of the device for sensing displacement in one or more degrees of freedom of the operator member.

BACKGROUND OF INVENTION

A remote center compliance device (RCC) is a passive device for aiding insertion and mating maneuvers in robot machines and assembly equipment. RCC's typically include a structure which supports an operator member and establishes a remote compliance center near the functioning end of the operator member. See U.S. Pat. Nos. 4,098,001; 4,155,169. In some robot and assembly applications there is a need for feedback from the RCC; however, force measurement is not always ideal for this purpose. For example, force sensors generally cannot withstand the large forces that occur when the RCC is driven to the limit against mechanical stops. In addition, force sensors generally cannot resolve the very small forces on the RCC when it is operating in its more normal range, not at its limits. Further, the mounting of the force sensors, usually between the RCC and its support from the host machine, interferes with the compliance of the RCC; the compliance of the remote center is not simply that of the RCC but the combination of the compliance of the RCC and the compliance of the force sensor apparatus.

SUMMARY OF INVENTION

It is therefore an object of this invention to provide an intrumented RCC capable of accurately measuring action of the RCC at very high and at very low force conditions as well as at intermediate force conditions.

It is a further object of this invention to provide such an instrumented RCC which measures displacements to monitor RCC action.

It is a further object of this invention to provide such an instrumented RCC which uses one or more displacement sensors to measure displacement in one or more degrees of freedom.

The invention is featured in an instrumented remote center compliance device which has an operator member and a remote compliance center near the end of the operator member. More specifically, the invention features one or more displacement sensors located proximate the operator member for sensing displacement in one or more degrees of freedom of the operator member. The sensors are arranged so as to produce a change in output from at least one of the sensors in response to changes in position relative to the radial axes of the operator member. In a preferred embodiment, there are first and second displacement sensors spaced from the operator member for sensing displacement thereof, and the first and second sensors are disposed to one another at a first angle about the axis of the operator member. There are third and fourth displacement sensors spaced from the operator member for sensing displacement thereof. The third and fourth sensors are spaced from the first and second sensors along the axis of the operator member and are disposed to each other at a second angle about the axis of the operator member. The sensors are disposed so as to produce an output from at least one sensor for changes of position of the operator member relative to the radial axes. By displacement herein is meant both angular and translational movement.

Typically, the first and second sensors are in one plane and the third and fourth are in a second, parallel plane, and the first and second angles are equal. In a simple case the first and second angles may both be equal to 90° and the sensor in each pair may be aligned with a sensor in the other pair. If necessary or desirable, fewer or more displacement sensors may be used, for example a fifth sensor may be used to sense a fifth degree of freedom of motion of the operator member.

The invention also features means for solving the equation $\overline{X} = A\overline{X}_1$, where A is a transfer matrix relating the displacement sensor output signals to displacement applied to the remote center compliance device which produces those output signals; $\overline{X}_1$ is the vector whose elements are the outputs of the sensors for determining $\overline{X}$, which is a vector whose elements are the components of the displacement supplied to the device. Although the sensors illustrated in the specification are of the photoelectric type, this is not a necessary limitation of the invention, for other types of transducers may be used and are sufficient, for example LVDT's, potentiometers, or any other displacement-sensitive transducer.

DISCLOSURE OF PREFERRED EMBODIMENT

Other objects, features and advantages will occur from the following description of a preferred embodiment and the accompanying drawings, in which:

FIG. 1 is an axonometric view of a remote center compliance device, RCC, of the type shown in U.S. Pat. No. 4,155,169, which may be instrumented according to this invention;

Figure 13:
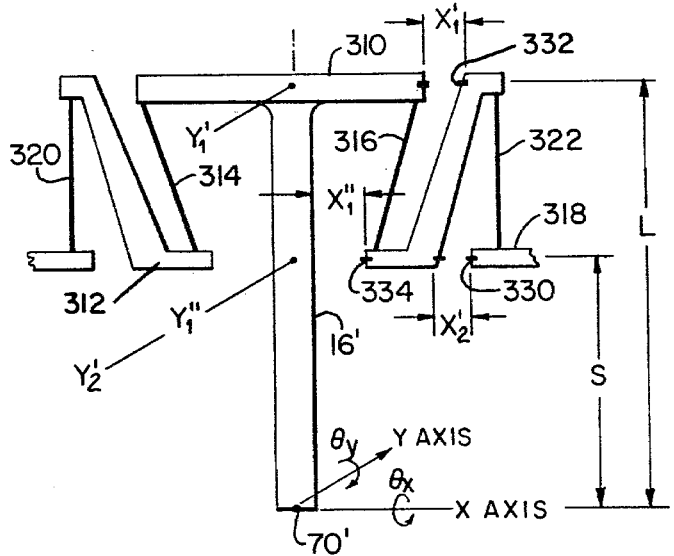
Figure 14:
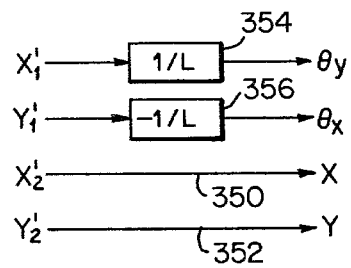
Figure 15:
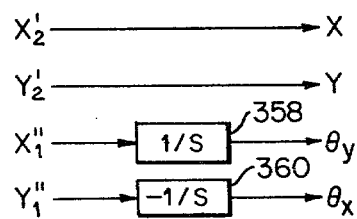

FIG. 13 is a schematic diagram of an RCC of the type shown in U.S. Pat. No. 4,098,011;

FIG. 14 is a simple block diagram of a circuit for resolving the measured displacement signals into the actual displacements for the RCC in FIG. 13; and FIG. 15 shows an alternative circuit similar to that in FIG. 14 for resolving measured displacement signals into actual displacements for the RCC's in FIG. 13.

The invention may be accomplished by disposing a number of displacement sensors on an RCC so that the relative angular and translational displacement between the moveable or operating member and the rest of the RCC can be detected. RCC's are disclosed in U.S. Pat. Nos. 4,098,001 and 4,155,169, which are incorporated here by reference. Any number of sensors may be used, but they should be disposed so that an output is produced from at least one sensor for changes of position of the operator member relative to the remainder of the RCC. The number of sensors used may be commensurate with the number of degrees of freedom that it is desired to monitor; for example, one sensor may be used to monitor one degree of freedom, four sensors to measure four degrees of freedom, five sensor to measure five degrees of freedom. However, more sensors may of course be used. RCC's typically do not have more than five degrees of freedom; they are constrained to permit no displacement in the axial direction. Once the displacement measuring signals are obtained from the sensor or sensors, they must be converted to resolved into an acceptable coordinate form to provide useful information. Typically in an X and Y coordinate system the X and Y translations, X, Y, and X and Y rotations $\theta_x$, $\theta_y$, of the operator member are desired to describe the movement of the operator member with respect to the remote compliance center. Computing circuits are necessary to resolve the measured displacement signals into the actual displacements of the operator member. The soundness of the block diagrams of the computing circuits disclosed herein may be verified and defined analytically through the use of geometry and algebra, or empirically by a calibration technique also taught herein.

A simple arrangement which uses a relatively simple computing circuit results from using four sensors, two in the plane perpendicular, i.e. radial, to the axis of the operating member, and two in a second plane parallel to the first plane. The sensors in each plane are at 90° to each other, and each is aligned with the sensor in the plane above. However, this is not a necessary limitation on the invention. For example, the angle between the sensors in each pair need not be 90°, and in fact the angle between one pair of sensors need not be equal to the angle between the other pair of sensors. The sensors need not be aligned each with another one, and in fact each of the sensors may be in a different plane. Of course, the number of sensors need not be fixed at four, but may be any number equal to or greater than the number of degrees of freedom that it is desired to monitor. For proper results, however, the sensors should be disposed so that there is an output produced from at least one of the sensors for changes of position of the operator member.

Figure 1:
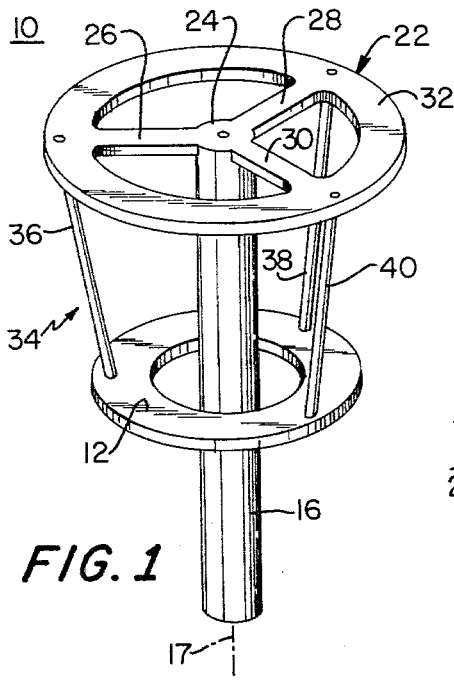

There is shown in FIG. 1 a remote center compliance device 10 which includes a deformable structure 22, from the central portion 24 of which is suspended operator member 16 having longitudinal or axial axis 17. Deformable structure 22 may also include three or more radially extending beams 26, 28, and 30, which are equally spaced and terminate in an intermediate rigid annular member 32. Beams 26, 28, and 30 lie along radial axes, i.e. axes perpendicular to the axial axis. Member 32 is carried by a second deformable structure 34 which includes three longitudinal beams 36, 38, and 40, which extend to a fixed portion such as housing 12, as illustrated in FIG. 2.

Figure 3:
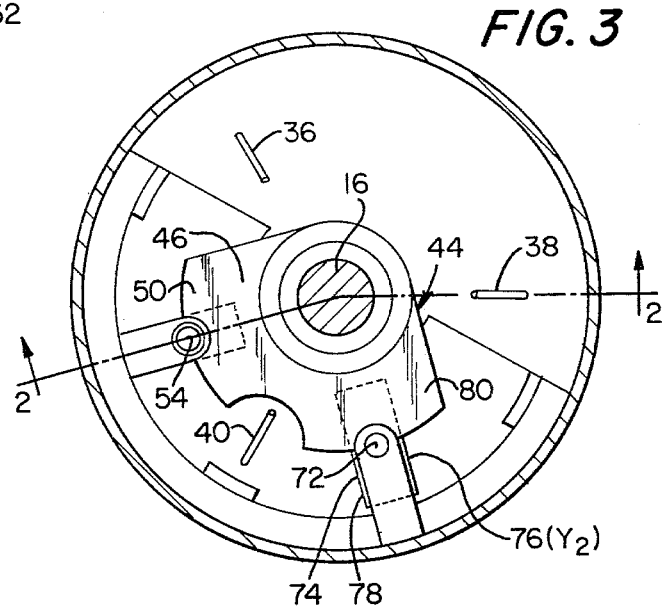
FIG. 3 is a plan view of the instrumented RCC device of FIG. 2 taken along line 3—3 of FIG. 2.
Figure 2:
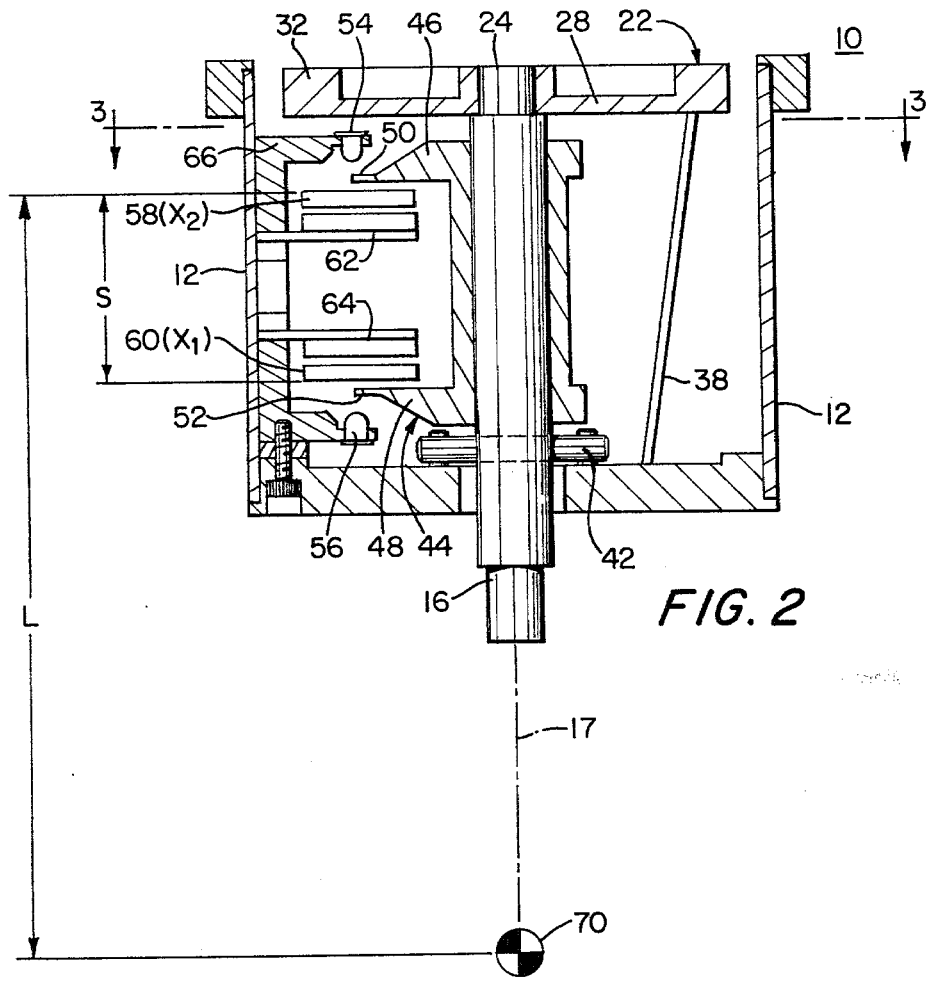
FIG. 2 is a more detailed sectional view of an RCC device such as shown in FIG. 1 with instrumentation according to this invention taken along line 2—2 of FIG. 3.

Attached to member 16, FIGS. 2 and 3, is a stop member 42 which limits the extent of motion of operator member 16 to prevent damage to the RCC. Also mounted to operator member 16 is a shade 44 which has two shade elements 46 and 48, whose outer edges 50, 52 sharply delineate the shadow area from that illuminated by light sources 54, 56 on sensors 58, 60 carried by supports 62, 64 on housing 12. Light sources 54, 56 are carried by support 66, also mounted on housing 12. Light source 54 and 56 may be Monsanto Electronic Special Products MV10B light-emitting diodes, for example, and sensors 58 and 60 may be Reticon RL 256G solid-state line scanners with associated timing and counting circuitry, for example. Sensors 58 and 60 may be considered the X axis sensors. A second set of sensors 76 and 78 (partly obscured) is typically provided, FIG. 3, with a second pair of light sources 72 and 74 (partly obscured). Shade 44 includes a second pair of shade elements 80 and 82 (not shown). The signals from sensors 58 and 60 are referred to as $X_2$ and $X_1$, respectively, and those from sensors 76 and 78 as $Y_2$ and $Y_1$, respectively.

Figure 4:
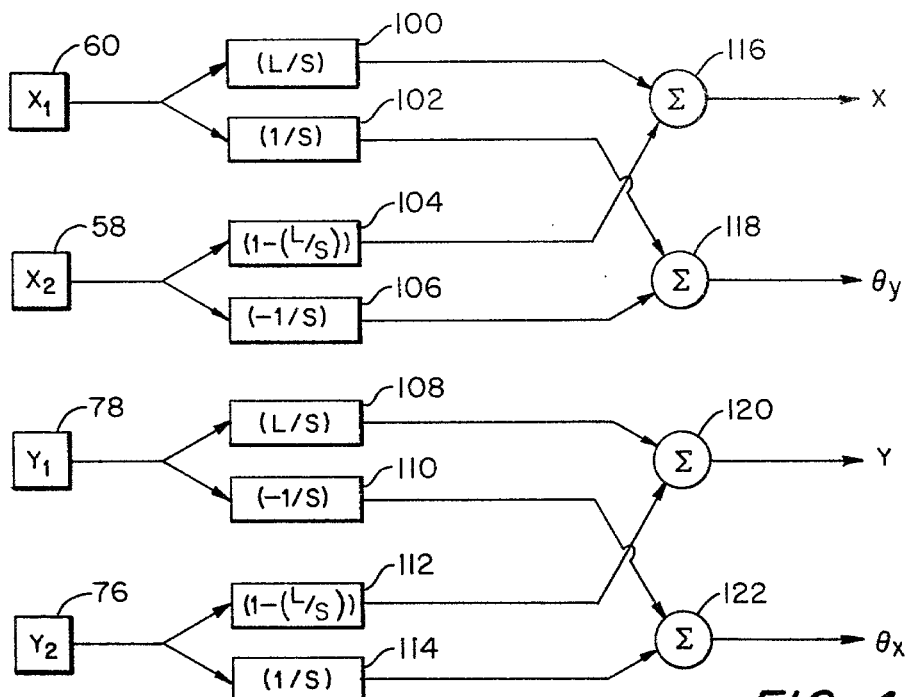
FIG. 4 is a block diagram of a computer circuit for resolving measured displacement signals into actual displacements.
Figure 5:
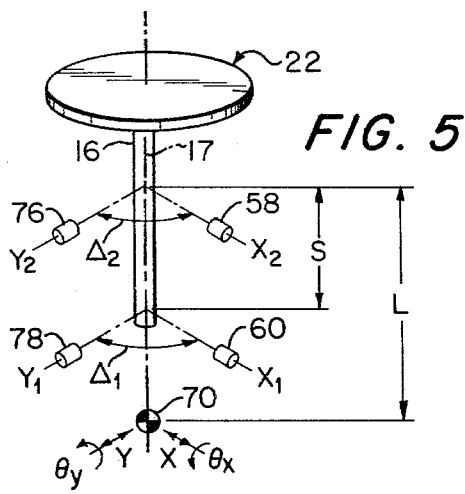
FIG. 5 is an axonometric schematic diagram illustrating basic parameters used in resolving measured displacement signals into actual displacements.

The measured signals $X_1$, $X_2$, $Y_1$, $Y_2$ may be resolved into the actual translational X, Y, and angular or rotational $\theta_x$, $\theta_y$ displacements of operator member 16 by the computing circuit shown in FIG. 4. There, $X_1$ is multiplied by the factor (L/S) in multiplier circuit 100, and by the factor (1/S) in multiplier circuit 102, where L is the distance from remote center 70 to the $X_2$, $Y_2$ signal sensing position and S is the distance between the $X_1$, $Y_1$ and $X_2$, $Y_2$ signal sensing positions, shown in FIG. 5. $X_2$ measured displacement signal is multiplied by the factor (1−L/S) in multiplier 104, and by the factor −(1/s) in multiplier 106. Measured signal $Y_1$ is multiplied by the factor (L/S) in multiplier 108 and −(1/S) in multiplier 110. Measured displacement signal $Y_2$ is multiplied by the factor (1−L/S) in multiplier circuit 112, and by the factor (1/S) in multiplier circuit 114. These multiplier factors are relatively simple since the sensors are arranged in pairs in parallel planes aligned with each other and with each pair at 90° to each other. The $X_1$, $X_2$ derived outputs from circuits 100 and 104 are combined in summer 116 to provide the actual displacement X. The $X_1$, $X_2$ derived outputs from circuits 102 and 106 are combined in summer circuit 118 to provide the displacement $\theta_y$. The $Y_1$, $Y_2$ derived outputs from circuits 108 and 112 are combined in summer circuit 120 to provide the actual Y displacement, and the $Y_1$, $Y_2$ derived outputs from circuits 110 and 114 are combined in summer 122 provide the $\theta_x$ output. This this approach is sound may be seen from FIG. 5, where $\Delta_1$ and $\Delta_2$ are both equal to 90°. The relationship of the measured displacement signals $X_1$, $X_2$, $Y_1$, $Y_2$ to the actual displacements X, Y, $\theta_x$, $\theta_y$ in terms of L and S is:

$$X_1 = X - \theta_y(L - S) \qquad (1)$$

$$X_2 = X - \theta_y(L) \qquad (2)$$

$$Y_1 = Y + \theta_x(L - S) \qquad (3)$$

$$Y_2 = Y + \theta_x(L) \qquad (4)$$

These equations may be expressed in matrix form for easier solution:

$$\begin{Bmatrix} X_1 \\ X_2 \\ Y_1 \\ Y_2 \end{Bmatrix} = \begin{bmatrix} 1 & 0 & 0 & (S-L) \\ 1 & 0 & 0 & (-L) \\ 0 & 1 & (L-S) & 0 \\ 0 & 1 & (L) & 0 \end{bmatrix} \begin{Bmatrix} X \\ Y \\ \theta_x \\ \theta_y \end{Bmatrix} \qquad (5)$$

which may be simply expressed as:

$$\overline{X}_1 = A^{-1}\overline{X} \qquad (6)$$

Thus, $\overline{X}_1$ is a vector whose elements are the outputs of the sensors.

These equations of course are not exact; they are standard approximations known and used in geometry. In order to solve for the actual displacements $\overline{X}$, the matrix may be inverted, $$\overline{X} = A\overline{X}_1 \qquad (7)$$

to the state:

$$\begin{Bmatrix} X \\ Y \\ \theta_x \\ \theta_y \end{Bmatrix} = \begin{bmatrix} \left(\frac{L}{S}\right) & \left(1-\frac{L}{S}\right) & 0 & 0 \\ 0 & 0 & \left(\frac{L}{S}\right) & \left(1-\frac{L}{S}\right) \\ 0 & 0 & \left(-\frac{1}{S}\right) & \left(\frac{1}{S}\right) \\ \left(\frac{1}{S}\right) & \left(-\frac{1}{S}\right) & 0 & 0 \end{bmatrix} \begin{Bmatrix} X_1 \\ X_2 \\ Y_1 \\ Y_2 \end{Bmatrix} \qquad (8)$$

In the general case wherein $\overline{X}_1$ may be of higher dimension than $\overline{X}$, equations (6) and (7) can be written $\overline{X}_1 = D\overline{X}$ and $\overline{X} = A\overline{X}_1$, respectively, where A*D equals II and II is the identity matrix. In the useful special case previously described in detail wherein X and $X_1$ are of the same dimension, A and D are square matrices and simply D equals $A^{-1}$.

Figure 6:
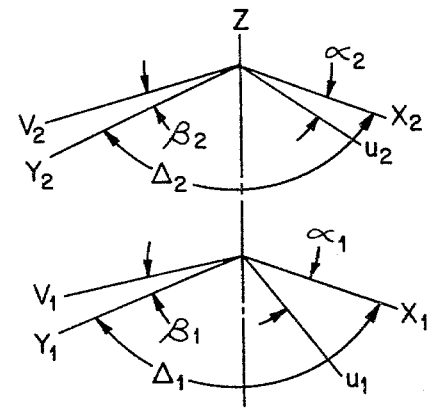
FIG. 6 is a more simplified schematic of the instrumentation of an RCC where the angle between the sensors in each pair of sensors is at an angle other than 90°.
Figure 7:
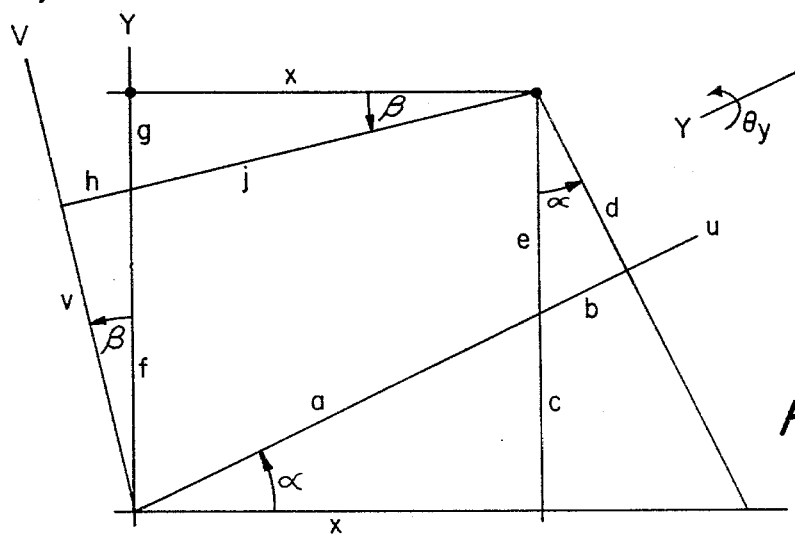
FIG. 7 is a diagram illustrating a basis for conversion from the axes of the sensors in FIG. 6 to the X,Y axes in FIG. 6.

Alternatively, when the sensors are not at 90° to each other, that is when $\Delta_1$ and $\Delta_2$ are not equal to 90° as shown in FIG. 6, the measured signals are represented by $U_1$, $U_2$, $V_1$ and $V_2$, which can be resolved in terms of the $X_1$, $X_2$, $Y_1$, and $Y_2$ coordinates shown in FIG. 6, where $U_1$ and $X_1$ are separated by the angle $\alpha_1$; $U_2$ and $X_2$ by the angle $\alpha_2$; $V_1$ and $Y_1$ by the angle $\beta_1$; and $V_2$ and $Y_2$ by the angle $\beta_2$. This conversion may be accomplished as shown in FIG. 7 using equations:

$$\begin{pmatrix} x = a \cos\alpha \\ a = u - b \\ b = e \sin\alpha \\ y = e + c \\ c = a \sin\alpha \\ f \cos\beta = v \\ j \cos\beta = x \\ j \sin\beta = g \\ g + f = y \end{pmatrix} \qquad (9)$$

which result in the matrix expression:

$$\begin{Bmatrix} x \\ y \end{Bmatrix} = \begin{bmatrix} \cos\alpha & -\dfrac{\sin\alpha \cos\alpha}{\cos\beta} \\ \sin\alpha & \dfrac{\cos^2\alpha}{\cos\beta} \end{bmatrix} \begin{Bmatrix} u \\ v \end{Bmatrix} \qquad (10)$$

For the specific case of $X_1$, $Y_1$ the matrix expression appears as:

$$\begin{Bmatrix} X_1 \\ Y_1 \end{Bmatrix} = \begin{bmatrix} \cos\alpha_1 & -\dfrac{\sin\alpha_1 \cos\alpha_1}{\cos\beta_1} \\ \sin\alpha_1 & \dfrac{\cos^2\alpha_1}{\cos\beta_1} \end{bmatrix} \begin{Bmatrix} U_1 \\ V_1 \end{Bmatrix} \qquad (11)$$

and for $X_2$, $Y_2$ the matrix expression appears as:

$$\begin{Bmatrix} X_2 \\ Y_2 \end{Bmatrix} = \begin{bmatrix} \cos\alpha_2 & -\dfrac{\sin\alpha_2 \cos\alpha_2}{\cos\beta_2} \\ \sin\alpha_2 & \dfrac{\cos^2\alpha_2}{\cos\beta_2} \end{bmatrix} \begin{Bmatrix} U_2 \\ V_2 \end{Bmatrix} \qquad (12)$$

These two expressions (11) and (12) are combined to produce:

$$\begin{Bmatrix} X_1 \\ Y_1 \\ X_2 \\ Y_2 \end{Bmatrix} = \begin{bmatrix} \cos\alpha_1 & -\dfrac{\sin\alpha_1 \cos\alpha_1}{\cos\beta_1} & 0 & 0 \\ \sin\alpha_1 & \dfrac{\cos^2\alpha_1}{\cos\beta_1} & 0 & 0 \\ 0 & 0 & \cos\alpha_2 & -\dfrac{\sin\alpha_2 \cos\alpha_2}{\cos\beta_2} \\ 0 & 0 & \sin\alpha_2 & \dfrac{\cos^2\alpha_2}{\cos\beta_2} \end{bmatrix} \begin{Bmatrix} U_1 \\ V_1 \\ U_2 \\ V_2 \end{Bmatrix} \qquad (13)$$

which when rearranged to present $X_1$, $X_2$, $Y_1$, $Y_2$ in the desired order, appears as:

$$\begin{Bmatrix} X_1 \\ X_2 \\ Y_1 \\ Y_2 \end{Bmatrix} = \begin{bmatrix} \cos\alpha_1 & -\dfrac{\sin\alpha_1\cos\alpha_1}{\cos\beta_1} & 0 & 0 \\ 0 & 0 & \cos\alpha_2 & -\dfrac{\sin\alpha_2\cos\alpha_2}{\cos\beta_2} \\ \sin\alpha_1 & \dfrac{\cos^2\alpha_1}{\cos\beta_1} & 0 & 0 \\ 0 & 0 & \sin\alpha_2 & \dfrac{\cos^2\alpha_2}{\cos\beta_2} \end{bmatrix} \begin{Bmatrix} U_1 \\ V_1 \\ U_2 \\ V_2 \end{Bmatrix} \quad (14)$$

Expression (14) may now be simply stated:

$$\overline{X}_1 < \overline{BU}_1 \quad (15)$$

Since we know from expression (7) that $\overline{X} = A\overline{X}_1$, we can substitute in expression (15) to arrive at expression (16), which fully expanded appears as expression (17).

$$\overline{X} = AB\overline{U}_1 \quad (16)$$

$$\begin{Bmatrix} X \\ Y \\ \theta_x \\ \theta_y \end{Bmatrix} = \begin{bmatrix} \left(\dfrac{L}{S}\right)\cos\alpha_1 & -\left(\dfrac{L}{S}\right)\dfrac{\sin\alpha_1\cos\alpha_1}{\cos\beta_1} & \left(1-\dfrac{L}{S}\right)\cos\alpha_2 & -\left(1-\dfrac{L}{S}\right)\dfrac{\sin\alpha_2\cos\alpha_2}{\cos\beta_2} \\ \left(\dfrac{L}{S}\right)\sin\alpha_1 & \dfrac{L}{S}\dfrac{\cos^2\alpha_1}{\cos\beta_1} & \left(1-\dfrac{L}{S}\right)\sin\alpha_2 & \left(1-\dfrac{L}{S}\right)\dfrac{\cos^2\alpha_2}{\cos\beta_2} \\ -\left(\dfrac{1}{S}\right)\sin\alpha_1 & -\left(\dfrac{1}{S}\right)\dfrac{\cos^2\alpha_1}{\cos\beta_1} & \left(\dfrac{1}{S}\right)\sin\alpha_2 & \left(\dfrac{1}{S}\right)\dfrac{\cos^2\alpha_2}{\cos\beta_2} \\ \left(\dfrac{1}{S}\right)\cos\alpha_1 & -\left(\dfrac{1}{S}\right)\dfrac{\sin\alpha_1\cos\alpha_1}{\cos\beta_1} & -\left(\dfrac{1}{S}\right)\cos\alpha_2 & \left(\dfrac{1}{S}\right)\dfrac{\cos\alpha_2\cos\alpha_2}{\cos\beta_2} \end{bmatrix} \begin{Bmatrix} U_1 \\ V_1 \\ U_2 \\ V_2 \end{Bmatrix} \quad (17)$$

Figure 8:
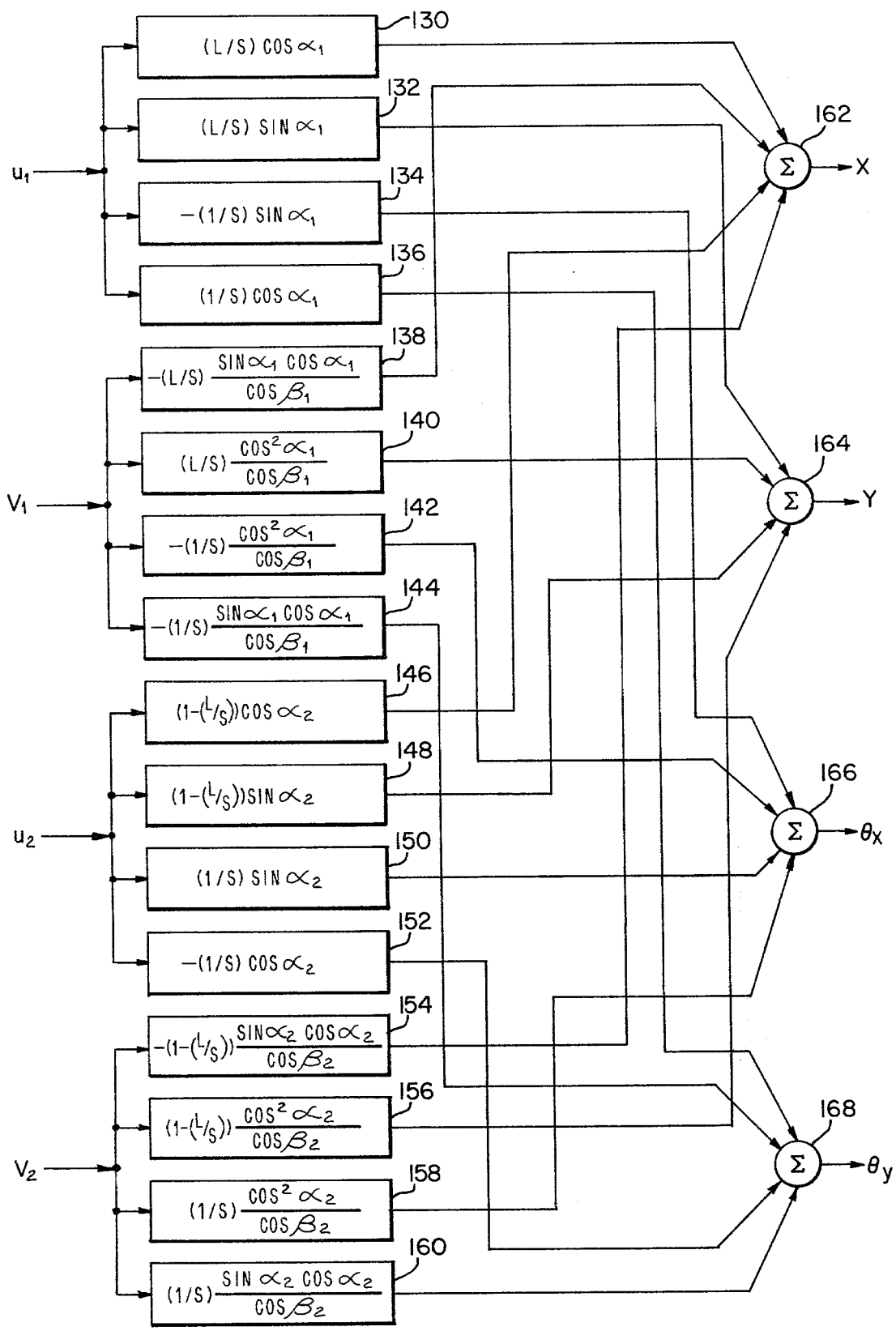
FIG. 8 is a block diagram of a computer circuit for calculating the actual displacements from the measured displacement outputs of the sensors.

A computer circuit which implements this statement includes a plurality of multiplier circuits 130 through 160, FIG. 8, which multiply the measured displacement signals $U_1$, $V_1$, $U_2$, and $V_2$, by the various factors shown in terms of the dimensions L, S, and the angles $\alpha$ and $\beta$, and are then combined in the combinations shown in summer circuits 162, 164, 166, and 168, to provide the actual displacements X, Y, $\theta_x$, and $\theta_y$.

Figure 9:
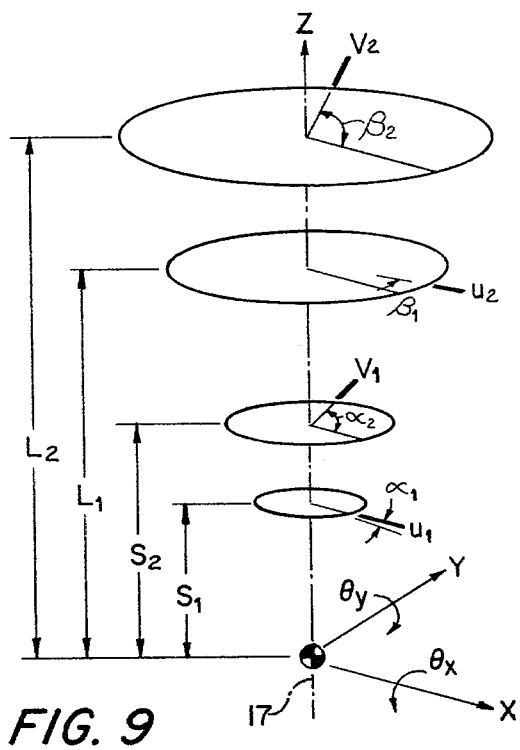
FIG. 9 is a simplified schematic diagram of the placement of sensors on an instrumented RCC when each of the sensors is in a different plane and at a different angle to the X,Y axes and there is no vertical alignment between any of the sensors.

In a similar manner, in the case where there are four sensors providing four measured signals $U_1$, $U_2$, $V_1$, and $V_2$ but none of the sensors are in the same plane nor aligned with each other, as shown in FIG. 9, the measured signals $U_1$, $U_2$, $V_1$, $V_2$ may be resolved into the desired, X, Y, $\theta_x$, $\theta_y$ components, as shown by the following expressions:

$$U_1 \simeq (\cos\alpha_1)X + (\sin\alpha_1)Y - (S_1\sin\alpha_1)\theta_x + (S_1\cos\alpha_1)\theta_y \quad (18)$$

$$U_2 \simeq (\cos\beta_1)X + (\sin\beta_1)Y - (L_1\sin\beta_1)\theta_x + (L_1\cos\beta_1)\theta_y \quad (19)$$

$$V_1 \simeq (\cos\alpha_2)X + (\sin\alpha_2)Y - (S_2\sin\alpha_2)\theta_x + (S_2\cos\alpha_2)\theta_y \quad (20)$$

$$V_2 \simeq (\cos\beta_2)X + (\sin\beta_2)Y - (L_2\sin\beta_2)\theta_x + (L_2\cos\beta_2)\theta_y \quad (21)$$

Figure 11:
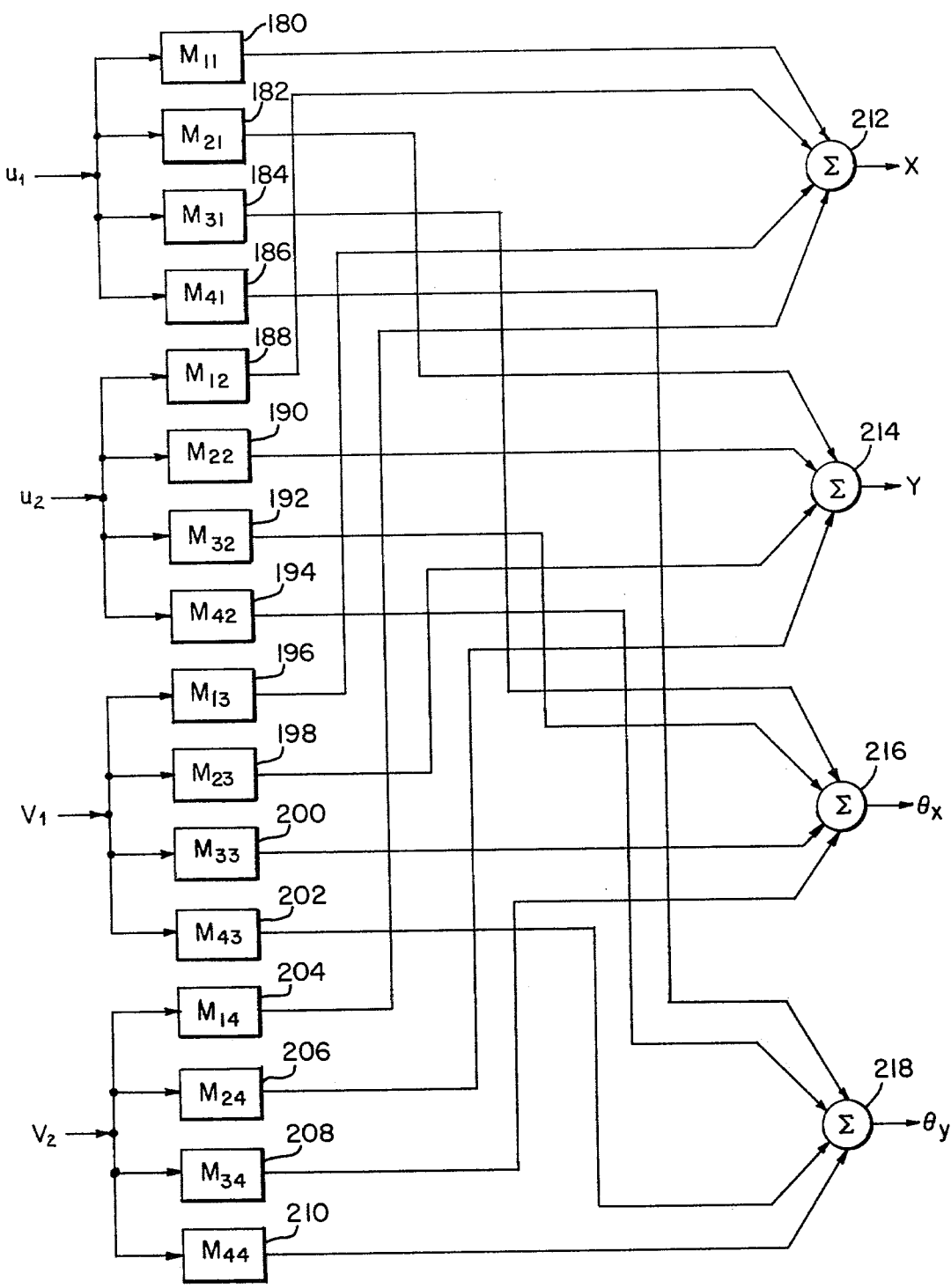
FIG. 11 is a block diagram of a computer circuit for resolving the measured displacement signals into actual displacements.

These expressions may be placed in matrix form, $$\begin{Bmatrix} U_1 \\ U_2 \\ V_1 \\ V_2 \end{Bmatrix} = \begin{bmatrix} \cos\alpha_1 & \sin\alpha_1 & -S_1\sin\alpha_1 & S_1\cos\alpha_1 \\ \cos\beta_1 & \sin\beta_1 & -L_1\sin\beta_1 & L_1\cos\beta_1 \\ \cos\alpha_2 & \sin\alpha_2 & -S_2\sin\alpha_2 & S_2\cos\alpha_2 \\ \cos\beta_2 & \sin\beta_2 & -L_2\sin\beta_2 & L_2\cos\beta_2 \end{bmatrix} \begin{Bmatrix} X \\ Y \\ \theta_x \\ \theta_y \end{Bmatrix} \quad (22)$$

and then inverted in the usual way, $$\begin{Bmatrix} X \\ Y \\ \theta_x \\ \theta_y \end{Bmatrix} = \begin{bmatrix} M_{11} & M_{12} & M_{13} & M_{14} \\ M_{21} & M_{22} & M_{23} & M_{24} \\ M_{31} & M_{32} & M_{33} & M_{34} \\ M_{41} & M_{42} & M_{43} & M_{44} \end{bmatrix} \begin{Bmatrix} U_1 \\ U_2 \\ V_1 \\ V_2 \end{Bmatrix} \quad (23)$$

to obtain the terms which define the multiplier factors that are implemented in multiplier circuits 180–210 in the computer circuit, FIG. 11.

The outputs of circuits 180–210 are combined in the groups shown in summer circuits 212, 214, 216, and 218, to provide directly the X, Y, and $\theta_x$, $\theta_y$ displacements.

Figure 10:
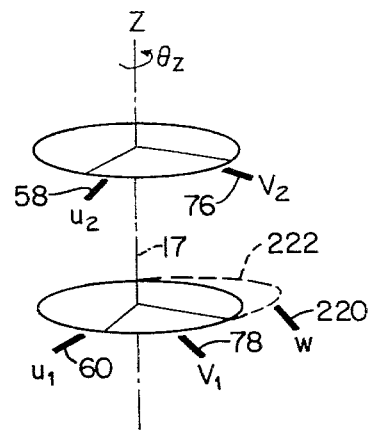
FIG. 10 is a schematic diagram showing one placement of a fifth sensor, which enables monitoring of five degrees of freedom of motion of an RCC.

Although thus far the illustrations have used four sensors to sense four degrees of freedom, this is not a necessary limitation of the invention, as fewer or more sensors may be used to monitor fewer or more degrees of freedom. For example, a fifth sensor 220, FIG. 10, may be added to produce a $\theta_z$ displacement signal which senses the rotation about the Z axis, axis 17, of the operator member. Sensor 220 is placed parallel to sensor 78 in order to sense the rotation about Z axis 17. To effect this, a non-circular member with some sort of camming surface 222 is used in conjunction with sensor 220 to detect the rotation. Alternatively, sensor 220 might be placed on the Z axis.

With five degrees of freedom being sensed by five sensors, the four expressions (18)–(21) would be expanded to include a fifth equation, and there would be a fifth column and fifth row added to the matrices in expressions (22) and (23), while the implementation shown in FIG. 11 would be expanded by the addition of one more multiplier circuit associated with each of the measured input signals $U_1$, $U_2$, $V_1$, $V_2$, and also the addition of a fifth input, for example $\theta_z$.

Alternatively, a calibration technique may be used to verify the multiplier factors in the computer circuit which resolves the measured displacement signals obtained from an instrumented RCC into the actual displacements of the operator member and body of the RCC relative to each other. First the instrumented RCC is fixed so that each degree of freedom, for example, X, Y, $\theta_x$, $\theta_y$, nd $\theta_z$, can be varied independently while all the others remain fixed or at zero displacement. This may be stated in matrix form as:

$$\begin{Bmatrix} U_1 \\ U_2 \\ U_3 \\ U_4 \\ U_5 \end{Bmatrix} = \begin{bmatrix} N_{11} & N_{12} & N_{13} & N_{14} & N_{15} \\ N_{21} & N_{22} & N_{23} & N_{24} & N_{25} \\ N_{31} & N_{32} & N_{33} & N_{34} & N_{35} \\ N_{41} & N_{42} & N_{43} & N_{44} & N_{45} \\ N_{51} & N_{52} & N_{53} & N_{54} & N_{55} \end{bmatrix} \begin{Bmatrix} X \\ Y \\ \theta_x \\ \theta_y \\ \theta_z \end{Bmatrix} \quad (24)$$

The U terms are the sensor outputs. If X is displaced a known amount $X_1$, not equal to zero, and all the remaining possible displacements, Y, $\theta_x$, $\theta_y$, $\theta_z$, are held at zero, the result may be expressed:

$$U_1 = N_{11} X_1 \quad (25)$$

$$U_2 = N_{21} X_1 \quad (26)$$

$$U_3 = N_{31} X_1 \quad (27)$$

$$U_4 = N_{41} X_1 \quad (28)$$

$$U_5 = N_{51} X_1 \quad (29)$$

and since the measured values $U_{1-5}$ are known and the displacement $X_1$ is shown, this set of equations may be transformed into:

$$N_{11} = \frac{U_1}{X_1} \quad (30)$$

$$N_{21} = \frac{U_2}{X_1} \quad (31)$$

$$N_{31} = \frac{U_3}{X_1} \quad (32)$$

$$N_{41} = \frac{U_4}{X_1} \quad (33)$$

$$N_{51} = \frac{U_5}{X_1} \quad (34)$$

Figure 12:
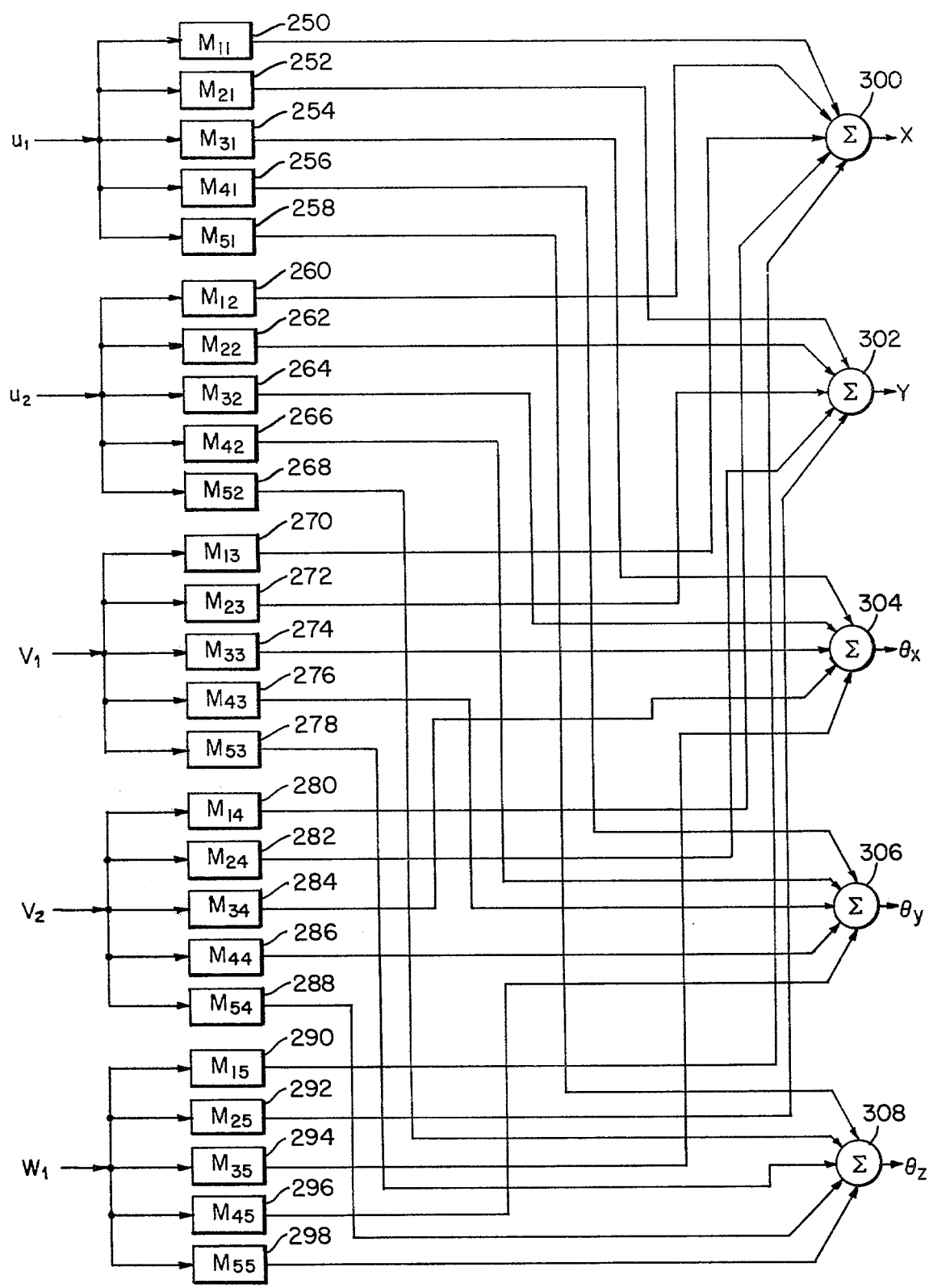
FIG. 12 is a block diagram of a circuit which may be constructed using calibration techniques to resolve measured displacement signals into actual displacements.

In a similar fashion, with Y set equal to $Y_1$, not equal to zero, and the remaining terms X, $\theta_y$, $\theta_z$ all set at zero, the same action may be taken to obtain the numerical values for the second column of the matrix of expression 24. When this is done, with all the numerical values in place in the matrix of expression (24), a simple matrix inversion results in:

$$\begin{Bmatrix} X \\ Y \\ \theta_x \\ \theta_y \\ \theta_z \end{Bmatrix} = \begin{bmatrix} M_{11} & M_{12} & M_{13} & M_{14} & M_{15} \\ M_{21} & M_{22} & M_{23} & M_{24} & M_{25} \\ M_{31} & M_{32} & M_{33} & M_{34} & M_{35} \\ M_{41} & M_{42} & M_{43} & M_{44} & M_{45} \\ M_{51} & M_{52} & M_{53} & M_{54} & M_{55} \end{bmatrix} \begin{Bmatrix} U_1 \\ U_2 \\ U_3 \\ U_4 \\ U_5 \end{Bmatrix} \quad (35)$$

where each of the M values in each row and column of the matrix is a numerical value and may be directly inserted in the multiplier circuits 250-298, FIG. 12, which are combined as shown in summing circuits 300, 302, 304, 306, and 308 to provide the actual displacements X, Y, $\theta_x$, $\theta_y$, $\theta_z$.

An even simpler implementation occurs with the RCC of U.S. Pat. No. 4,098,001, as shown in FIG. 13. In such a device, operating member 16' typically is supported by a member 310, which in turn is supported by an intermediate device 312 by means of a number, typically three, flexures 314, 316, only two of which are shown, which converge toward each other and meet at a point 70' which generally establishes the remote compliance center along the axis 17' of operator member 16'. Flexures 314, 316 are in turn fastened to intermediate member 312, which is attached to a support 318 by means of typically three additional flexures 320, 322, only two of which are shown. Typically flexures 320, 322 control only translational motion, while flexures 314, 316 independently provide the rotational flexibility for the instrument. In this case a single sensor 330, located as shown between support 318 and intermediate member 312, provides the signal $X'_2$, which is indicative of motion along the X axis. Motion about the Y axis is indicated by the measured signal $X'_1$ obtainable from sensors 332, or from $X''_1$, obtainable from sensor 334. Similar signals $Y'_1$, $Y''_1$, and $Y'_2$ are obtained in the same way with respect to the Y axis translational and X axis rotational displacements. Because of this independent action in the translational and rotational motion modes in RCC 10', the actual displacement along the X axis, X, is equal to the measured value $X'_2$, $$X = X'_2 \quad (36)$$

and similarly the displacement along the Y axis is equal to the measured displacement $Y'_2$:

$$Y = Y'_2 \quad (37)$$

Rotational motion about the X axis, $\theta_x$, is either:

$$\theta_x = \frac{-Y'_1}{L} \quad (38)$$

or:

$$\theta_x = \frac{-Y''_1}{S} \quad (39)$$

Similarly, $\theta_y$ is either:

$$\theta_y = \frac{X'_1}{L} \quad (40)$$

or:

$$\theta_y = \frac{X''_1}{S} \quad (41)$$

Thus the computing circuit implementation to resolve the $X'_1$, $Y'_1$, $X'_2$, and $Y'_2$ measured displacements into the actual displacements $\theta_y$, $\theta_x$, X, and Y, may be simple: direct connections 350, 352, to resolve the $X'_2$ and $Y'_2$ signals into X and Y displacements. Multiplier circuit 354 multiplies $X'_1$ signal by a factor of (1/L) to obtain $\theta_y$, and multiplier circuit 356 multiplies $Y'_1$ displacement signal by a factor of (−1/L) to obtain $\theta_x$.

Similarly, using the combination $X'_2$, $Y'_2$, and $X''_1$, $Y''_1$, only multiplier circuits 358, providing a factor of (1/S), and multiplier circuit 360, providing a factor of (−1/S), are necessary to complete the computing circuit 10. As in FIG. 14, $X'_2$ and $Y'_2$ directly provide the X and Y displacements.

Other embodiments will occur to those skilled in the art and are within the following claims:

What is claimed is:

1. In a remote center compliance device having an operator member and a remote compliance center near the end of the operator member, the improvement comprising:

a reference structure proximate to and fixed relative to said operator member;

first and second displacement sensors mounted on said reference structure spaced from said operator member for sensing displacement thereof, said first and second sensors being disposed to one another at a first angle about the axis of said operator member;

third and fourth displacement sensors mounted on said reference structure spaced from said operator member for sensing displacement thereof, said third and fourth sensors being spaced from said first and second sensors along the axis of said operator member and disposed to each other at a second angle about the axis of said operator member; said sensors being disposed to produce an output from at least one sensor for any displacement relative to radial axes of said operator member.

2. In a remote center compliance device having an operator member and a remote compliance center near the end of the operator member, the improvement comprising:

a reference structure proximate to and fixed relative to said operator member;

first and second displacement sensors mounted on said reference structure spaced from said operator member for sensing displacement thereof, said first and second sensors being disposed to one another at a first angle about the axis of said operator member;

third and fourth displacement sensors mounted on said reference structure spaced from said operator member for sensing displacement thereof, said third and fourth sensors being spaced from said first and second sensors along the axis of said operator member and disposed to each other at a second angle about the axis of said operator member; a fifth sensor, spaced from each of the other four sensors; said sensors being disposed to produce an output from at least on sensor for any displacement of said operator member.

3. The improvement of claim 1 or 2 in which said first and second sensors are in a first plane perpendicular to the axial axis and said third and fourth sensors are in a second plane perpendicular to the axial axis.

4. The improvement of claim 1 or 2 in which said first and second angles are equal.

5. The improvement of claim 4 in which said first and second angles are 90°.

6. The improvement of claim 4 in which said first and third and second and fourth sensors are aligned in planes through the longitudinal axis.

7. The improvement of claim 1 further including:
means for solving the equation $\overline{X} = A\overline{X}_1$, where A is a transfer matrix relating the displacement sensor output signals to displacements applied to the remote center compliance device which produces those output signals, $\overline{X}_1$ is a vector whose elements are the outputs of the sensors, for determining $\overline{X}$, a vector whose elements are the components of the displacements applied to the device.

8. In a remote center compliance device having an operator member and a remote compliance center near the end of the operator member the improvement comprising:

a reference structure proximate to and fixed relative to said operator member;

first and second displacement sensors mounted on said reference structure spaced from said operator member for sensing displacement thereof, said first and second sensors being disposed to one another at a first angle about the axis of said operator member;

third and fourth displacement sensors mounted on said reference structure spaced from said operator member for sensing displacement thereof, said third and fourth sensors being spaced from said first and second sensors along the axis of said operator member and disposed to each other at a second angle about the axis of said operator member; said sensors being disposed to produce an output from at least one sensor for any displacement relative to radial axes of said operator member; and means for solving the equation $\overline{X} = A\overline{X}_1$, where A is a transfer matrix relating the displacement sensor output signals to displacements applied to the remote center compliance device which produces those output signals, $\overline{X}_1$ is a vector whose elements are the outputs of the sensors, for determining $\overline{X}$, a vector whose elements are the components of the displacements applied to the device.

9. A method of measuring an unknown displacement on the operator member of a remote center compliance device having a remote compliance center near the end of the operator member comprising:

disposing one or more displacement sensors about said device for producing output signals representative of displacement of said operator member;

applying known displacements to said operator member, so that there exists no sensed displacement which cannot be expressed in terms of one or more applied displacements;

measuring each of the output signals produced by each of the sensors in response to the applied displacements;

calculating a transfer matrix D defined by the equation $\overline{X}_1 = D\overline{X}$ as determined by the applied displacements and the corresponding sensor output signals, where $\overline{X}$ is a vector whose elements are the components of the applied displacements and $\overline{X}_1$ is a vector whose elements are the outputs of the sensors;

applying an unknown displacement to the operator member;

measuring each of the output signals from each sensor in response to the unknown displacement;

calculating the unknown displacement by solving the equation $\overline{X} = A\overline{X}_1$, where $\overline{X}_1$ is a vector whose elements are the sensor outputs in response to the unknown displacement and $\overline{X}$ is a vector whose elements are the components of the unknown displacement.

10. A method of calibrating displacements of an operator member of an instrumented remote center compliance device having a remote compliance center near the end of the operator member, and having one or more displacement sensors about the device for producing signals representative of displacement of the operator member comprising:

applying known displacements to said operator member so that there exists no sensed displacement which cannot be expressed in terms of one or more applied displacements;

measuring each of the output signals produced by each of the sensors in response to the applied displacements; and calculating a transfer matrix D defined by the equation $\overline{X}_1 = D\overline{X}$ as determined by the applied displacements and the corresponding sensor output signals, where $\overline{X}$ is a vector whose elements are the components of the applied displacements, and $\overline{X}_1$ is a vector whose elements are the outputs of the sensors.

11. In a remote center compliance device having an operator member and a remote compliance center near the end of said operator member the improvement comprising:
   a reference structure proximate to and fixed relative to said operator member;
   one or more displacement sensors, located proximate said operator member, said sensors being mounted on said reference structure and arranged to produce a change in output from at least one of said sensors in response to displacements relative to radial axes of said operator member; and
   means for solving the equation $\overline{X} = A\overline{X}_1$, where A is a transfer matrix relating the displacement sensor output signals to displacements applied to the remote center compliance device which produces those output signals, $\overline{X}_1$ is a vector whose elements are the outputs of the sensors, for determining $\overline{X}$, a vector whose elements are the components of the displacements applied to the device.

* * * * *